United States Patent [19]

Falconer et al.

[11] 4,074,086
[45] Feb. 14, 1978

[54] JOINT ADAPTIVE ECHO CANCELLER AND EQUALIZER FOR TWO-WIRE FULL-DUPLEX DATA TRANSMISSION

[75] Inventors: David Duncan Falconer, Linkoping, Sweden; Stephen Brant Weinstein, Holmdel, N.J.

[73] Assignee: Bell Telephone Laboratories, Incorporated, Murray Hill, N.J.

[21] Appl. No.: 720,999

[22] Filed: Sept. 7, 1976

[51] Int. Cl.² .............................................. H04B 3/24
[52] U.S. Cl. ................................ 179/170.2; 178/58 R
[58] Field of Search .................... 178/58 R; 179/170.2, 179/170.6, 170.8; 333/18

[56] References Cited

U.S. PATENT DOCUMENTS

| Re. 27,250 | 12/1971 | Lucky | 333/18 |
|---|---|---|---|
| 3,597,541 | 8/1971 | Proakis et al. | 179/170.2 |
| 3,732,410 | 5/1973 | MacKechnie | 179/170.2 |
| 3,878,468 | 4/1975 | Falconer et al. | 178/88 |
| 3,922,505 | 11/1975 | Hoge | 179/170.2 |

OTHER PUBLICATIONS

Koll & Weinstein; "Simultaneous Two-way Data Transmission Over a Two-wire Circuit"; I.E.E.E. Transactions on Communications; vol. COM-21, No. 2; Feb. 1973; pp. 143-147.

Primary Examiner—Kathleen H. Claffy
Assistant Examiner—Randall P. Myers
Attorney, Agent, or Firm—Joseph P. Kearns

[57] ABSTRACT

An adaptive equalizer and echo canceller jointly respond to a common error difference between the actual output and the quantized digital output of a data receiver in a two-wire digital data transmission system to achieve simultaneous full-bandwith full-duplex operation. Two-wire transmission channels are typically terminated in hybrid balancing networks which because of their fixed impedances permit "echoes" of the transmitted signal to interfere with reception of the much weaker incoming signal. Both the equalizer and canceller are adaptively adjustable transversal structures.

10 Claims, 4 Drawing Figures

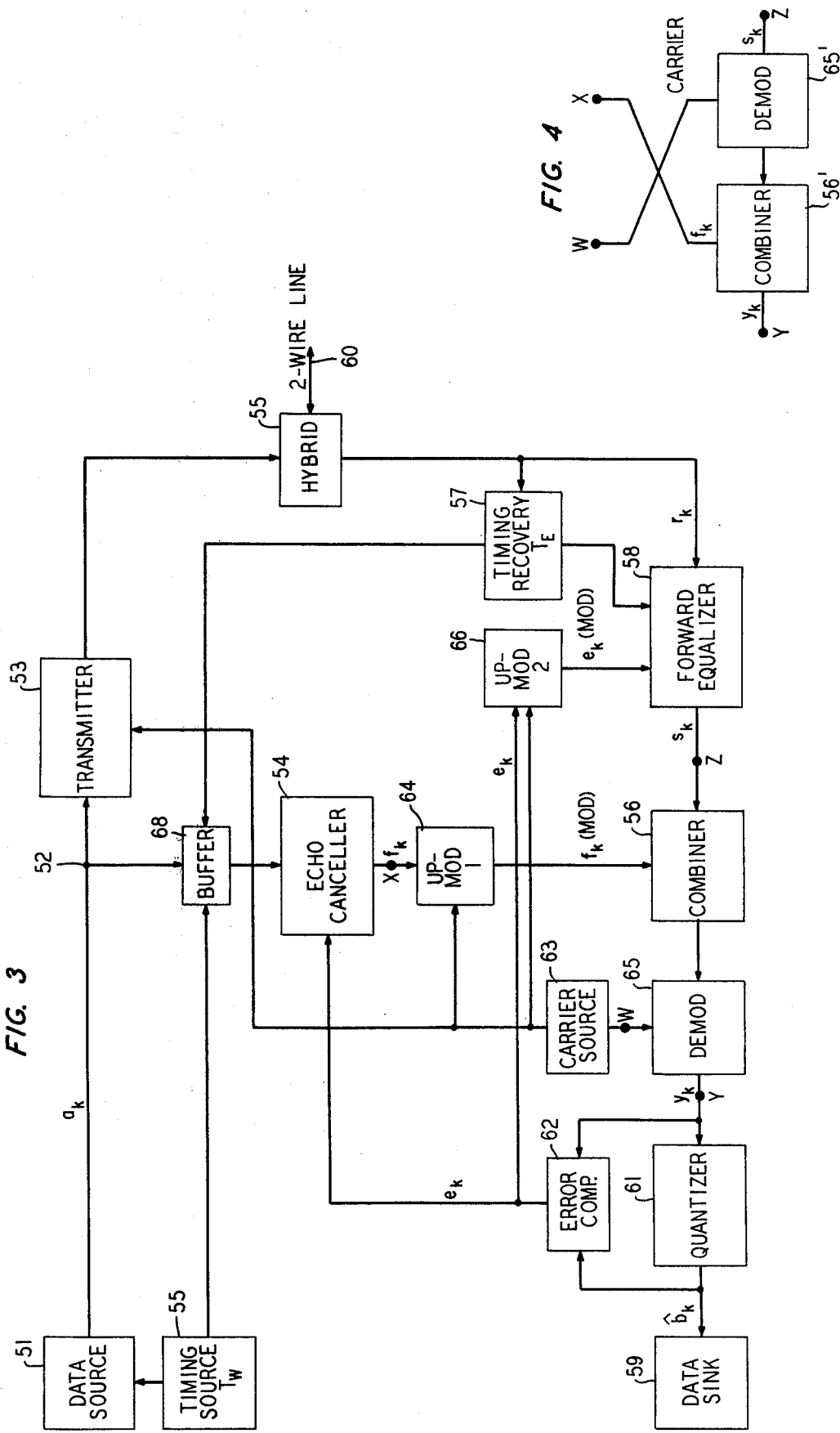

JOINT ADAPTIVE ECHO CANCELLER AND EQUALIZER FOR TWO-WIRE FULL-DUPLEX DATA TRANSMISSION

FIELD OF THE INVENTION

This invention relates to the suppression of echo and leakage energy from digital data transmitted and received through hybrid junctions in two-way telephone transmission systems equipped with a delay and amplitude distortion equalizer.

BACKGROUND OF THE INVENTION

Much of today's high-speed data communication traffic is carried out in two directions simultaneously; that is, the traffic is full duplex. For data speeds below about 2400 bits per second the voiceband extending from approximately 300 to 3000 Hz can be divided in half to allow dedication of each half to a particular transmission direction on an equivalent four-wire transmission line basis. For data speeds above 2400 bits per second two physically separate two-wire transmission lines of voice bandwidth are currently required. If two-way high-speed simultaneous communication between two points could be accomplished at full bandwidth on a single two-wire channel, significant cost savings would become possible. Furthermore, a capability of simultaneous two-way digital data communication on the public switched direct-distance-dialing (DDD) network would be valuable in cases where the data customer could benefit from zero "turn-around" time. Under present practices reversing the direction of transmission on a half-duplex DDD transmission channel requires time to disable built-in echo suppressors.

Heretofore, full-duplex data transmission on a two-wire transmission channel has been implemented by utilizing separate segments of the available transmission band, each dedicated to a preassigned transmission direction. This split band method, while feasible and fairly simple to implement, has these disadvantages:

1. The sum of the data rates for the two transmission directions is less than or at most equal to the otherwise attainable one-way data rate for the given channel operating in the half-duplex mode; and
2. Each transmitter uses a different frequency band, depending on whether it is at the originating or terminating end of a communication channel. This circumstance can result in equipment duplication and elaborate transmission protocols, i.e., start-up routines.

Many long-haul toll telephone facilities include echo suppressors which are designed to suppress reverse traffic when forward traffic has seized the facility. Whenever the direction of traffic is to be reversed, one set of echo suppressors must be disabled and another set activated. Thus, simultaneous two-way traffic is precluded without special arrangements for disabling all echo suppressors. Such arrangements are routinely included in many full duplex voice grade modems. With speech traffic it is not usually contemplated that both parties will be speaking simultaneously.

For simultaneous two-way transmission within the same frequency band it is mandatory to separate the local transmitter signal from the usually weak signal received from the remote site. Hybrid networks or bridge circuits, realizable with or without transformers, are standard, well known arrangements for achieving this separation. In such circuits, a terminating impedance equal to the impedance of the two-wire line must be used for perfect separation. Due to the complex and frequency dependent nature of this impedance only a very approximate compensation is possible in practice with passive circuits. Direct current leakage across the hybrid and delayed echoes caused by signals reflected from more distant impedance mismatches will cause transmitted signal components to interfere with the received distant signal.

Adaptive echo cancellers implemented by transversal filters have been proposed for analog facilities by, for example, J. L. Kelly, Jr., and B. F. Logan, Jr., in U.S. Pat. No. 3,500,000 issued Mar. 10, 1970. In the latter echo canceller a portion of the analog signal incoming to a hybrid junction on the four-wire side is passed through a transversal filter with adjustable tap-gain controls to synthesize a cancellation signal for subtraction from the signal outgoing from the hybrid junction. The resultant outgoing signal is clipped and correlated with the sequence of samples of the incoming signal appearing at the taps of the transversal filter to form control signals for the tap gains or weighting coefficients of the transversal filter.

A similar arrangement is described by F. K. Becker and H. R. Rudin in the *Bell System Technical Journal* (Vol. 45, 1966, pp. 1847–1850), in a paper entitled "Application of Automatic Transversal Filters to the Problem of Echo Suppression." Results achieved with a practical realization of the transversal filter as an adaptive echo suppressor are reported by V. G. Koll and S. B. Weinstein in *I.E.E.E. Transaction on Communications*, (Vol. COM-21, No. 2, 1973, pp. 143–147) in a paper entitled, "Simultaneous Two-Way Data Transmission Over a Two-Wire Circuit."

The aforementioned echo cancellers employing transversal structures require tap spacings at the reciprocal of twice the highest frequency present in the message-signal to be transmitted, principally because the signal to be transmitted is assumed to be analog in nature. In the typical voice bandwidth of 4000 Hz eight taps are required for each millisecond of anticipated echo delay. Such intervals are known as Nyquist intervals and relate to the transmitted signal as the reciprocal of twice the highest frequency present.

In the copending U.S. patent application of K. H. Mueller (Ser. No. 636,297, filed Nov. 28, 1975) an echo cancelling signal is synthesized in a transversal structure having taps spaced at baud intervals, rather than at Nyquist intervals, from samples of the baseband data to be transmitted prior to modulation or application to the hybrid network under the control of an error signal obtained at the output of the receiver portion of a data transceiver.

It is an object of this invention to provide improved simultaneous full duplex digital data transmission over two-wire communications facilities with full bandwidth utilization for each transmission direction.

It is another object of this invention to provide an improved echo cancellation signal for full duplex data transmission systems from baud-rate samples of the transmitted signal.

It is a further object of this invention to provide jointly for echo cancellation and forward equalization responsive to a common digital error signal in a simultaneous full duplex, full bandwidth digital data transmission system.

It is yet another object of this invention to provide jointly for echo cancellation and forward equalization in a manner which compensates for differences in the sampling rates for transmitted and received digital data signals.

SUMMARY OF THE INVENTION

In accordance with this invention an incoming distant data signal received through a hybrid junction from a two-wire transmission facility is equalized and simultaneously an undesired echo component originating in a local source for an outgoing data signal is substantially cancelled to provide simultaneous full bandwidth two-way digital data transmission over a two-wire transmission facility. The incoming data signal is equalized in a transversal structure having taps spaced at baud intervals prior to application of the echo cancellation signal. The echo cancellation signal is synthesized from baud-interval samples of the outgoing data signal prior to modulation into the passband of the transmission facility. A common decision-directed error signal based on the criterion of minimizing the mean-square difference between an unquantized and a quantized receiver output is correlated with the signal samples at each tap of the respective equalizer and echo-cancelling transversal structures.

In one illustrative embodiment all operations are carried out at baseband, i.e., the frequency band extending to zero frequency. Included in this embodiment is an elastic buffer for compensating for possible differences in phase between outgoing and incoming signals.

In another illustrative embodiment operations are carried out at passband, i.e., the frequency band associated with a carrier frequency and having no zero frequency component. In this embodiment the echo cancellation signal is synthesized at baseband, but translated up to passband before being combined with the equalized received signal. At the same time the forward equalizer operates on the received signal before demodulation in the receiver proper. Differences in phase between transmitted and received signals can also be compensated in the passband embodiment. In the passband embodiment the cancellation signal can alternatively be combined with the equalized received signal before or after demodulation.

Feature of this invention include joint adaptive adjustment and updating of an echo equalizer and a forward receiver channel equalizer on a baud-rate basis; digital implementation using baud-rate sample values; a common criterion of minimization of the mean-square error or receiver output samples by adjustment of both the echo and forward equalizers; and the application of a linear combination of residual echo and received signal to the receiver for data decisions to realize joint convexity of mean-square error with respect to the tap-gain coefficients in both equalizers.

BRIEF DESCRIPTION OF THE DRAWING

The objects and features of this invention will become more apparent from a consideration of the following detailed description and the drawing in which:

FIG. 3 is a block diagram of a combined echo cancellation and received signal equalization arrangement for a passband terminal of a digital data transmission system according to this invention; and FIG. 4 is an alternative variant of the demodulator-combiner aspect of FIG. 3.

DESCRIPTION OF THE ILLUSTRATIVE EMBODIMENTS

Figure 1:
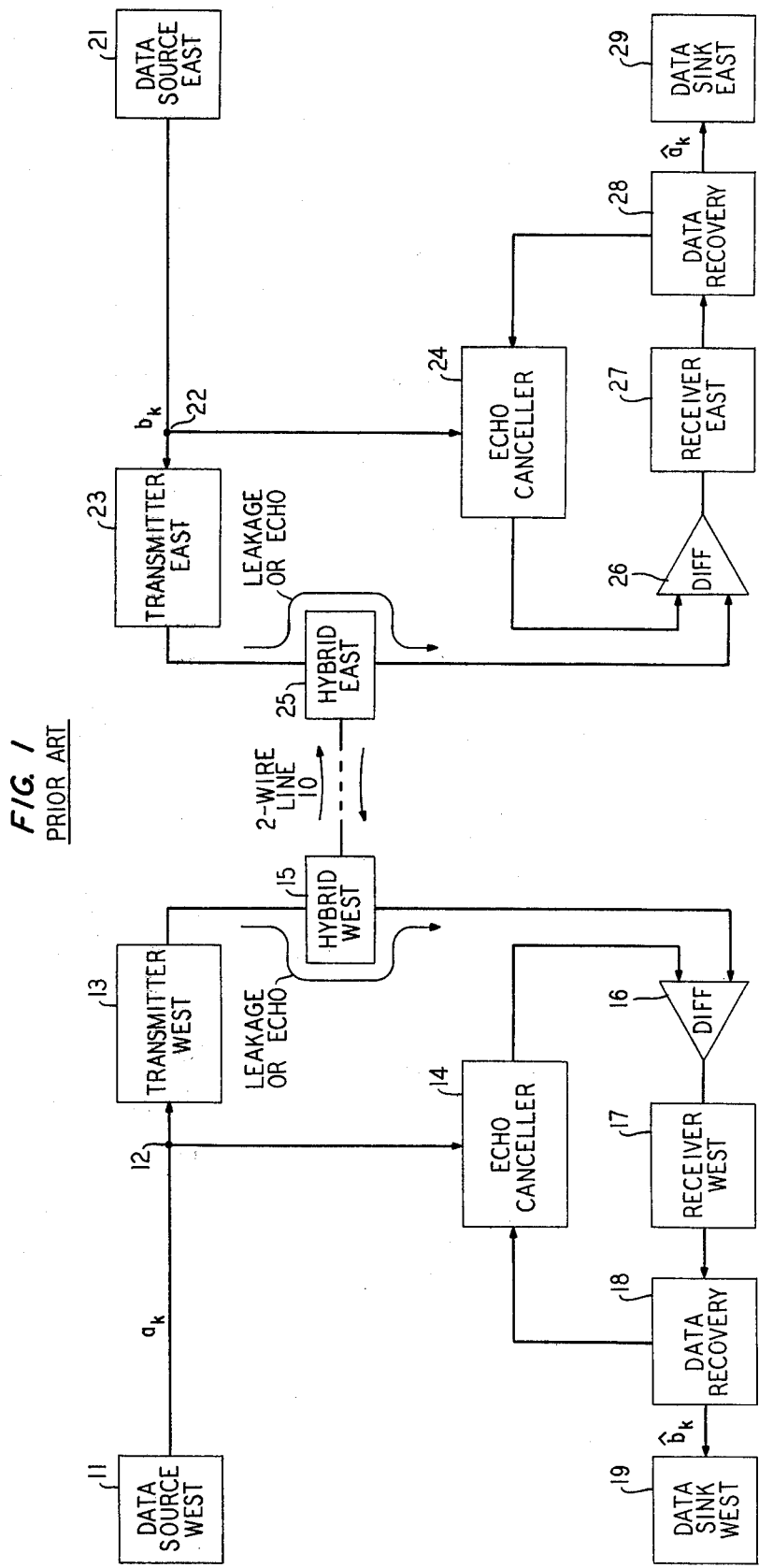
FIG. 1 is a block diagram of a prior art two-way, two-wire full duplex digital data transmission system providing an echo cancellation feature.

FIG. 1 depicts a full duplex, two-wire digital data transmission system having an echo canceller at each terminal for the purpose of establishing simultaneous two-way data transmission. The system shown in FIG. 1 is substantially that disclosed in the aforementioned K. H. Mueller patent application.

FIG. 1 shows respective east and west data terminals linked together by two-wire transmission medium 10. The east terminal comprises data source east 21 providing a baseband data sequence $b_k$, transmitter east 23, hybrid east 25, receiver east 27, data recovery 28 for restoring received baseband data sequence $a_k$, data sink east 29, echo canceller 24 and differencing circuit 26. Similarly, the west terminal comprises data source west 11 providing baseband data sequence $a_k$, transmitter west 13, hybrid west 15, receiver west 17, data recovery 18 for restoring received baseband data sequence $b_k$, data sink west 19, echo canceller 14 and differencing circuit 16. In the absence of echo cancellers 14 and 24 data source west 11 can only alternate with data source east 21 in transmitting at full bandwidth data sequences $a_k$ and $b_k$ respectively to data sink each 29 and data sink west 19. The reason that simultaneous full duplex, full bandwidth data transmission has not heretofore been practiced is principally that hybrid networks 15 and 25 can provide only compromise impedance matches to line 10, which has a different makeup from call to call and can even be time variant during calls. The imperfect match at the hybrids permits significant leakage of the relatively stronger signal from the local transmitter around the hybrid junction and significantly interferes with the relatively weaker received signal. As earlier proposed, an echo canceller responsive to the shaped or modulated transmitted output was placed directly in parallel with the leakage path around the hybrid junction for the purpose of generating a cancellation signal. Mueller modified this proposal by making the echo canceller responsive to baud-interval samples of the baseband source data, rather than to modulated or filtered data as applied to the hybrid network, and by deriving the error signal for tap-gain coefficient adjustment from the quantized receiver output data. This modification substantially reduced the number of taps required on the transversal structure that synthesizes the cancellation signal.

FIG. 1 is a simplified diagram of the Mueller modification in which at the west terminal the baseband data sequence $a_k$ from source 11 and incident at junction 12 is applied alike to transmitter 13 for conventional shaping or modulation and to echo canceller 14. In its easiest-to-implement form canceller 14 is a transversal structure which stores a plurality of elements of the sequence $a_k$ and provides these elements at taps thereon to adjustable tap-gain devices for summation into the desired cancellation signal. The cancellation signal from canceller 14 is combined by subtraction with the incoming sampled received signal which includes transmitted sequence $b_k$ and an echo component originating in source 11. An error-correction loop is completed through receiver 17 and data recovery 18 whereby a control signal proportional to the error difference between the analog input and quantized digital output of data recovery 18 is generated. This control signal is cross-correlated with all the tap outputs of canceller 14 to adjust the tap gains in a direction to minimize the error.

The same functions and operations are performed at the east terminal in transmitting the data sequence $b_k$ and receiving the incoming signal containing the data sequence $a_k$.

The Mueller disclosure did not specifically treat the equalization problem with respect to amplitude and delay distortion in the received signal. It may, however, be surmised that at data speeds over 2400 bits per second an equalizer would be required in the receiver. Consistent with the overall Mueller disclosure forward equalization would be obtained within the receiver proper, that is, after the echo-cancellation signal has been subtracted from the received signal. Our investigation of this arrangement reveals that a serious convergence problem arises when an attempt is made to control the adjustment of tap-gain devices on both the echo canceller and forward equalizer from a common error signal. We have concluded that only when equalization of the received line signal is accomplished before echo cancellation can convergence be reliably attained in both equalizer and cancellation transverse structures.

Figure 2:
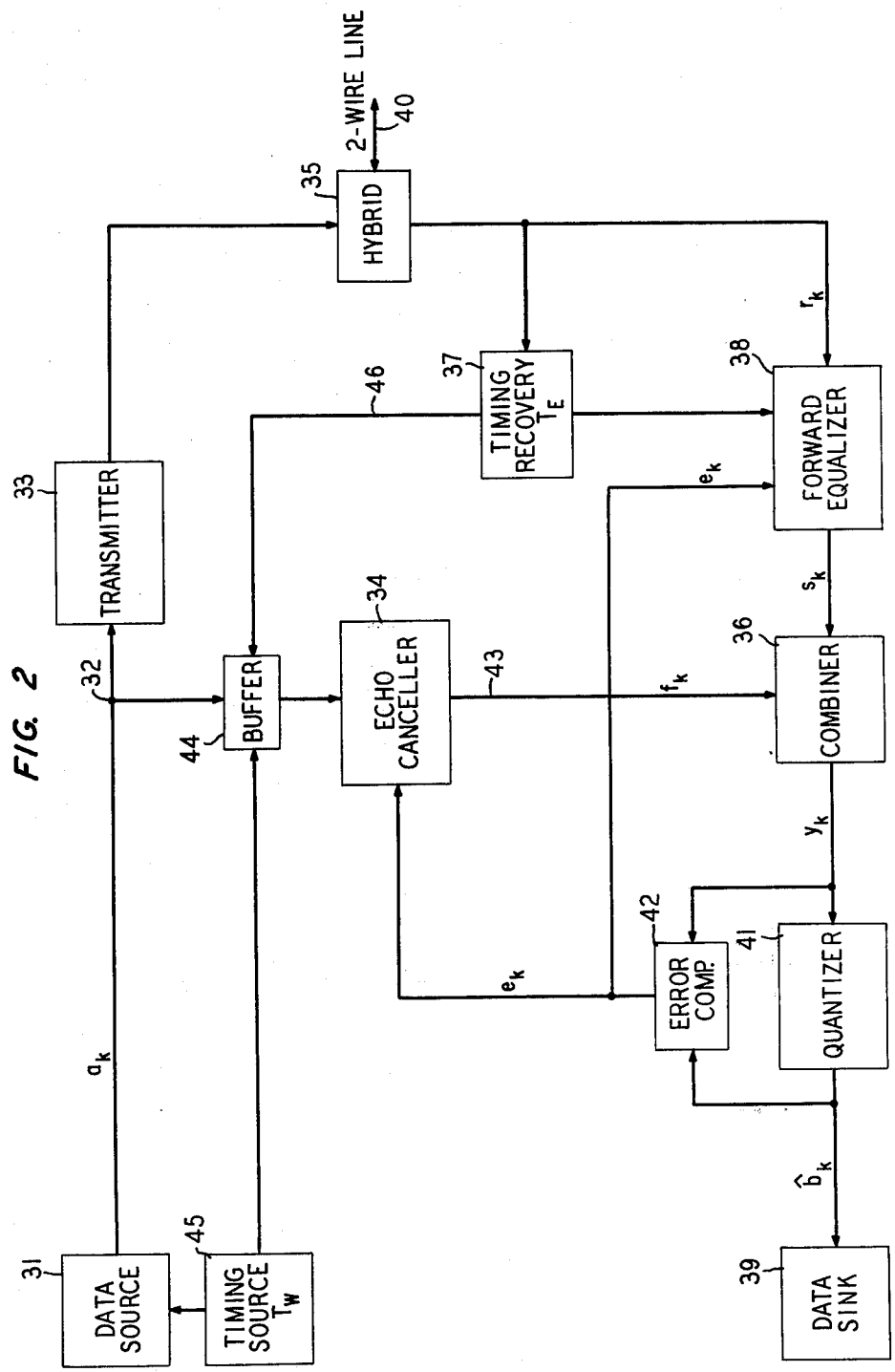
FIG. 2 is block diagram of a combined echo cancellation and received-signal equalization arrangement for a baseband terminal of a digital data transmission system according to this invention.

FIG. 2 represents a single terminal of a data transmission system modified according to this invention to provide joint forward and echo equalization at baseband frequencies. An exactly matching terminal is assumed to be connected to the other end of two-wire line 40. FIG. 2 differs from FIG. 1 in explicitly indicating that the receiver includes forward equalizer 38, quantizer 41, error computer 42, combiner 36, data sink 39 and timing recovery 37. FIG. 2 further shows that echo canceller 34 is connected to data source 31 at junction 32 through elastic buffer 44 and that timing source 45 controls data source 31 and the input to echo canceller 34. Echo canceller 34 accepts a sequence $a_k$ of outgoing data signals and performs a linear operation on a finite succession of members of the sequence $a_k$ under the control of error signal $e_k$ obtained in error computer 42 as the error difference between the input and output of quantizer 41. The output sequence $f_k$ from echo canceller 34 on lead 43 is subtracted in combiner 36 from the output $s_k$ of equalizer 38.

Output sequence $s_k$ from forward transversal equalizer 38 is a linear sequence formed by passing a succession of samples $r_k$ of the signal wave received from hybrid network 35 through a transversal filter with adjustable tap gains to form the sequence $s_k$ from which intersymbol interference has been substantially removed. The signal $s_k$ is combined subtractively with cancellation signal $f_k$ from echo canceller 34 to form received signal $y_k$. The signal $y_k$ is quantized with respect to one or more preselected discrete digital amplitudes to obtain an estimate of the received data sequence $b_k$. The latter sequence is delivered to data sink 39, which is the customer's part of the data terminal. The difference between the input $y_k$ to quantizer 41 and its digital output $b_k$ taken in error computer 42 is the error sequence $e_k$.

Both echo cancellers and forward equalizers described herein can be classified generically as linear signal processors.

During every baud interval each tap gain coefficient of the echo canceller and of the equalizer is adjusted in proportion to the product of its current stored sample ($a_k$ and $r_k$ respectively) with the current error signal $e_k$. This use of the error signal $e_k$ to adjust both sets of tap coefficients jointly leads to the minimization of the mean-squared value of $e_k$.

The operation and adaptation of the terminal is described as follows: let $a_k$ and $r_k$ be vectors whose components are the samples stored in the canceller and equalizer respectively in the $k^{th}$ band interval. Let the current sets of echo canceller and equalizer tap coefficients be represented by the vectors $p_k$ and $w_k$ respectively (underscoring implies a vector). Then the canceller output is $$f_k = p_k^T a_k, \qquad (1)$$

where superscript T stands for the transpose of the vector. The transversal equalizer output is $$s_k = w_k^T r_k, \qquad (2)$$

and the output of combiner 36 is $$y_k = s_k - f_k. \qquad (3)$$

The error signal is $$e_k = y_k - b_k. \qquad (4)$$

The tap coefficients are adjusted as follows:

$$p_{k+1} = p_k + \beta_1 e_k a_k \qquad (5a)$$

$$w_{k+1} = w_k - \beta_2 e_k r_k, \qquad (5b)$$

where $\beta_1$ and $\beta_2$ are suitably chosen step sizes.

In principle the receiver portion of the terminal in FIG. 2 will cancel any echo component within the span of the canceller's memory that would otherwise be present in the output sequence $y_k$, provided the symbol rates at the east and west ends of two-wire line 40 are identical, i.e., baud or symbol intervals $T_E$ and $T_W$ are equal and in phase. To provide for the practical situation in which the intervals $T_E$ and $T_W$ differ slightly, buffer 44 is interposed between junction 32, at which the outgoing data sequence $a_k$ is available at a clock rate determined by interval $T_W$ from timing source 45, and echo canceller 34. The operation of buffer 44 is under the joint control of timing source 45 and timing recovery 37 by way of lead 46 to effect a "slip" function.

Buffer 44 provides first-in, first-out elastic buffering which brings in locally generated information digits from data source 31 at rate $1/T_W$. The same information digits also enter the echo channel which comprises the leakage path across hybrid 35 and thereby contaminate the received signal sequence $r_k$. Samples of the received signal are admitted to forward equalizer 38 at rate $1/T_E$. The equalized sequence $s_k$ from which intersymbol interference has been substantially removed leaves equalizer 38 at rate $1/T_E$ and is applied to one input of combiner 36. To another input of combiner 36 the sequence $f_k$, the echo cancellation signal, is applied. For optimum echo cancellation it is apparent that cancellation sequence $f_k$ should have substantially the same timing rate as equalized sequence $s_k$. This is accomplished when transmitted symbol interval $T_W$ equals receiver symbol interval $T_E$.

Buffer 44 can comprise a multistage shift register whose input timing is controlled at rate $1/T_W$ and whose output timing is controlled at rate $1/T_E$.

When $T_W$ equals $T_E$, buffer 44 is transparent to data sequence $a_k$. When $T_W$ is found to be greater than $T_E$, buffer 44 is not filling as fast as it is being emptied. The situation is remedied by skipping the next readout, e.g., by inhibiting a timing pulse at rate $1/T_E$, and by shifting the tap gain coefficients from echo canceller 34 one tap to the left, i.e., toward its input.

When $T_E$ is found to be greater than $T_W$, buffer 44 is being overfilled. The remedy then is to read out two digits from buffer 44 within one $T_W$ interval into echo canceller 34 and currently to shift the tap gain coefficients for echo canceller 34 one tap to the right i.e., away from its input.

By either of these slip adjustments responsive to the algebraic sign of the difference between $T_W$ and $T_E$ the synchronism of the echo cancellation signal $f_k$ with equalized received signal $s_k$ is restored at the cost of losing one tap-signal correlation at one or the other end of echo canceller 34. This end loss is negligible, however, in practical cases because the tap coefficient values decay markedly from the central reference magnitude to those at the ends of the transversal structure. In fact the slip operation becomes nearly transparent as the end values approach zero.

FIG. 3 is a block diagram of a single terminal of a data transmission system operating at passband frequencies over a two-wire transmission channel modified according to this invention to provide joint equalization and echo cancellation. An exactly matching terminal is asumed to be connected to the end of two-wire line 60. The passband terminal of FIG. 3 is substantially the same in principle as that shown in FIG. 2. It differs in having an explicit showing of modulators 64 and 66, demodulator 65 and carrier source 63. Transmitter 53 now includes a modulator (not explicitly shown) under the control of the output of carrier source 63 in addition to any impulse response shaping filters.

In operation data source 51 generates a synchronous data sequence $a_k$ at a rate $T_W$ determined by timing source 65. This data sequence appearing at junction 52 is applied to transmitter 53 and buffer 68. Transmitter 53 modulates a carrier wave from carrier source 63 with data sequence $a_k$ and shapes the resultant wave to match the transmission characteristics of two-wire line 60 to which the wave has access by way of hybrid network 55. The buffered data sequence $a_k$ is applied to echo canceller 54, preferably a multitapped transversal structure with an adjustable gain device interposed between each tap and an output summer. The summed output of canceller 54 is a new sequence $f_k$ which is used to cancel echo components contaminating the received signal. Since the received signal to be compensated is at the passband frequency level of two-wire line 60 the baseband sequence $f_k$ is up-modulated under the control of the carrier signal from source 63 in number one up-modulator 64.

At the same time that transmitter 53 is providing an outgoing carrier modulated signal to two-wire line 60, an independent received signal from a remote terminal (not shown) at passband level may be incident on hybrid 55. Due to less than perfect balance attainable in practice in hybrid junction 55 an unpredictable residue of the transmitted signal leaks across the junction to form, together with distant reflections, an echo which becomes intermixed with the relatively weaker received signal $r_k$. The received signal $r_k$ is also applied to timing recovery 57 from which sampling instants at $T_E$ intervals are obtained.

Because timing must be derived from the distant signal in the presence of an interfering local echo signal, a decision-directed timing recovery scheme is necessary. An example of such a scheme, which is readily modified to accommodate passband signals, is found in "Timing Recovery in Digital Synchronous Data Receivers " by K. H. Mueller and M. Mueller, *IEEE Trans. on Communications*, May 1976, pp. 516–531.

Received signal $r_k$ sampled at the rate $1/T_E$ is applied to forward equalizer 58. The equalized sequence $s_k$ is formed from the summation of the products of the equalizer's tap gains with the corresponding tap samples of received signal $r_k$ in forward equalizer 58. The tap gains are adjusted during each baud interval in proportion to the correlation products of error signal $e_k$ (MOD) with the corresponding tap samples $r_k$.

Equalizer received signal $s_k$ is now subtractively combined with cancellation signal $f_k$ (MOD) in combiner 56 to form an equalized passband signal substantially free of echo contamination. The latter signal in turn is demodulated to baseband signal $y_k$ in demodulator 65 under the control of a demodulating carrier wave from carrier source 63. Baseband signal $y_k$ is quantized in quantizer 61 is derive output data signal $b_k$ which is applied jointly to data sink 59 and error computer 62. Error computer 62 provides error signal $e_k$ at its output as the difference between baseband signal $y_k$ and digital output signal $b_k$. As previously explained, error signal $e_k$ controls echo canceller 54 directly and after up modulation in modulator 66 under the control of carrier source 63 provides passband error signal $e_k$ (MOD) to forward equalizer 58. The most probable embodiment of the passband structure is in a phase modulation or quadrature amplitude modulation data transmission system. In such an embodiment, the equalization, echo cancellation and adaptation operations parallel those of the baseband embodiment of FIG. 2, but the data symbols $a_k$ and $b_k$, received signals $r_k$, tap coefficients $w_k$ and $p_k$, outputs $s_k$, $f_k$ and $f_k$ (MOD), and errors $e_k$ are represented by complex-valued quantities, the real and imaginary parts of which correspond to parallel in-phase and quadrative values respectively. Implementation of passband equalization, demodulation and carrier recovery in passband quadrature amplitude or phase modulation systems is more fully described in U.S. Pat. No. 3,878,468 granted to D. D. Falconer, K. H. Mueller, J. Salz and D. A. Spaulding on Apr. 15, 1975.

In a manner similar to that described in connection with the baseband embodiment of FIG. 2, data sequence, $a_k$ from data source 51, which is sampled at intervals $T_W$ under the control of timing source 55, is buffered to echo canceller 54 through buffer 68. Buffer 68 also accepts a timing input at intervals $T_E$ from timing recovery 57 with the result that echo canceller 54 receives its input samples effectively at $T_E$ intervals. The mechanics of the buffering operation are the same as previously explained with reference to FIG. 2. When buffer 68 tends to overflow, two output samples are read out during one $T_W$ intervals. When buffer 68 is underfilling, an output sample is skipped. Concurrent shifts in the tap-gain coefficients of echo canceller 54, as previously explained, are made to avoid disturbances in the output signal $f_k$.

Alternatively, the echo cancellation signal $f_k$ obtained from block 54 in FIG. 3 can be combined at baseband frequency level with the equalized received signal $s_k$ after demodulation. In FIG. 3 the cancellation signal $f_k$ was translated to passband frequency level for direct combination with the equalized received signal $s_k$. Four junctions are identified in FIG. 3, namely: $w$ the junction between carrier source 63 and demodulator 65; $x$ the junction between echo canceller 54 and upmodulator 64; $y$, the junction between demodulator 65 and quantizer 61; and $z$, the junction between forward equalizer 58 and combiner 56. The elements connected within these junctions $w$, $x$, $y$ and $z$, that is, up-modulator 65, combiner 56 and demodulator 65, can be removed from the receiver section of FIG. 3 and replaced by the elements shown in FIG. 4 with the same functional result.

FIG. 4 shows demodulator 65' in series with, and preceding in the direction of signal flow, combiner 56'. These elements are identical to those shown in FIG. 3. The inputs and outputs of these elements 56' and 65' are terminated in junction points designated $w$, $x$, $y$ and $z$ These junction points are intended to be attached to the corresponding junction points in FIG. 3. When the indicated substitution is accomplished, the equalized signal $s_k$ from forward equalizer 58 is immediately demodulated in demodulator 65' under the control of carrier source 63 at terminal $w$ to baseband frequency level. The resultant baseband received signal is then combined in combiner 56' with a baseband cancellation signal $f_k$ directly from echo canceller 54 at terminal $x$ to form the output signal $y_k$ at terminal $y$. This signal $y_k$ is substantially the same as that obtained in the original circuit of FIG. 3. The arrangement of FIG. 4 obviates the need for upmodulator 64.

In summary, an adaptive equalization arrangement for simultaneous two-way communication on a two-wire transmission line, using full channel bandwidth for each direction of transmission, incorporates an echo equalizer to cancel components of the local transmitted signal at detector sampling instants in addition to a forward equalizer for removing intersymbol interference components. Where the echo equalizer memory spans that of the echo channel, i.e., the path across the hybrid junction, perfect echo cancellation is possible. Consequently, the forward tap-gain coefficients and receiver performance are potentially the same as for one-way data communication with linear equalization. Because the forward equalization precedes echo equalization at the receiver, the tap-gain coefficients of both equalizer structures can be adjusted jointly from a common decision-directed mean-square error minimization algorithm, the error being the difference between the demodulated output of the receiver and the quantized data symbol. While this invention has been described in terms of specific illustrative embodiments, it will be understood that it is susceptible of modification by those skilled in the art to which it relates within the spirit and scope of the appended claims.

What is claimed is:

1. A joint echo cancellation and forward equalization arrangement for a digital data transmission system having both a transmitter section and a receiver section for simultaneous two-way signaling a full bandwidth over a common signal path comprising at each such terminal,
   a first adjustable signal processor in said receiver section for producing an output signal compensated for intersymbol interference inherent in signals traversing said common signal path to and from a remote terminal,
   a second adjustable signal processor for compensating for echoes of signals being transmitted by said transmitter section which have leaked into said receiver section having an output connected to a data source in said transmitter section and an output connected in sutractive relationship with the output signal from said first signal processor,
   combining means in said receiver section providing said subtractive relationship, and
   means responsive to the error difference between quantized and actual outputs of said combining means in said receiver section for generating a joint error control signal for said first and second signal processors.

2. The arrangement defined in claim 1 in which said transmission system operates at baseband frequencies between terminals.

3. The arrangement defined in claim 1 in which said transmission system operates at passband frequencies between terminals and the output of said second signal processor is up modulated to said passband frequency region before being subtracted from the output of said first signal processor and in which said joint error control signal is up modulated to said passband frequency region before application to said first signal processor.

4. The arrangement defined in claim 1 in which said transmission system operates at passband frequencies between terminals and the output of said first signal processor is demodulated to a baseband frequency region before being combined with the output of said first signal processor and in which said joint error control signal is upmodulated to said passband frequency region before application to said first signal processor.

5. The arrangement defined in claim 1 and elastic buffer means interposed beween a data source in said transmitter section and said second signal processor to compensate for the difference in synchronous timing phases for respective transmitted and received signals.

6. In a two-way fuel-duplex data transmission system having a four-wire to two-wire bridge between a common transmission link and each system terminal including separate transmitter and receiver sections,
   a first compensation circuit for transmitter signal components leaking across said bridge and reflected from the remote terminal between transmitter and receiver sections at each terminal for forming an echo cancellation signal,
   a second compensation circuit for intersymbol-interference components in signals received through said bridge from the remote terminal in said receiver section at each terminal for forming an equalized signal,
   means for combining the echo-cancelling and equalized signals from said first and second compensation circuits in the receiver section to form a resultant signal substantially free of both intersymbol-interference and leakage components, and
   means responsive to the error differences between quantized and actual resultant signal outputs of said receiver section for forming a joint error control signal for said first and second compensation circuits.

7. The two-way data transmission system defined in claim 6 further comprising an elastic buffer responsive to respective synchronous timing rates of transmitted and received data signals for transferring data to be transmitted into said first compensation circuit.

8. The two-way data transmission system defined in claim 6 further comprising at each terminal thereof,
   a carrier wave source, a transmitter under the control of said carrier wave source for translating data signals to be transmitted to the passband of said transmission system,
a first up-modulator under the control of said carrier wave source for elevating the echo-cancellation signal from said first compensation circuit to the passband of said transmission system,
a first up-modulator under the control of said carrier wave source for elevating the echo-cancellation signal from said first compensation circuit to the passband of said transmission system,
a second up-modulator under the control of said carrier wave source for elevating the joint error control signal from said error control signal forming means to the passband of said transmission system before application to said second compensation circuit, and
a demodulator under the control of said carrier wave source for translating the resultant signal from said combining means to baseband.

9. The two-way data transmission system defined in claim 6 further comprising at each terminal thereof,
a carrier wave source,
a transmitter under the control of said carrier wave source for translating data signals to be transmitted to the passband of said transmission system,
an up-modulator under the control of said carrier wave source for translating the joint error control signal from said error control signal forming means to the passband of said transmission system, before application to said second compensation circuit, and
a demodulator under the control of said carrier wave source for translating the equalized signal from said second compensation circuit to baseband before combination with said echo-cancelling signal in said combining means.

10. In combination with a digital data trnsmission system including terminals with transmitter and receiver sections for simultaneous two-way transmission at full bandwidth over a common transmission channel comprising at each terminal
a data signal source in the transmitter section,
an adjustable equalizer operating on incoming signals applied to said receiver section for forming equalized signals,
an adjustable echo canceller having an input connected to said data signal source for an outgoing signal from the transmitter section and an output connected in subtractive relationship with said equalized signals from said receiver section,
combining means in said receiver section providing said subtractive relationship, and
an error signal circuit responsive to the difference between quantized and actual outputs of said combining means in said receiver section for generating an error signal for joint control of the adjustments of said echo canceller and equalizer to minimize such error signal.

* * * * *